United States Patent [19]
Wagner et al.

[11] 3,903,052
[45] Sept. 2, 1975

[54] POLYMERS CONTAINING ALKOXYSILYL-SUBSTITUTED BIURET GROUPS AND PROCESSES FOR THEIR PREPARATION

[75] Inventors: Kuno Wagner, Leverkusen; Hans Jurgen Muller, Cologne, both of Germany

[73] Assignee: Bayer Aktiengesellschaft, Leverkusen, Germany

[22] Filed: Aug. 17, 1973

[21] Appl. No.: 389,299

[30] Foreign Application Priority Data
Sept. 6, 1972   Germany.............................. 2243628

[52] U.S. Cl...... 260/75 TN; 260/2.5 A; 260/46.5 E; 260/77.5 R; 260/77.5 NC; 260/77.5 AT; 260/448.2 E; 260/448.2 N
[51] Int. Cl........................ C08g 22/06; C08g 22/18
[58] Field of Search... 260/77.5 R, 77 NT, 77.5 AT, 260/77.5 NC, 46.5 E, 448.2 E, 448.2 N

[56] References Cited
UNITED STATES PATENTS

| | | | |
|---|---|---|---|
| 3,591,560 | 7/1971 | Wagner et al. | 260/77.5 AT |
| 3,629,196 | 12/1971 | Hahn et al. | 260/77.5 AT |
| 3,642,854 | 2/1972 | Kozjukov et al. | 260/77.5 AT |
| 3,654,336 | 4/1972 | Krimm et al. | 260/77.5 AT |
| 3,673,233 | 6/1972 | Golitz et al. | 260/46.5 E |
| 3,676,478 | 7/1972 | Golitz et al. | 260/46.5 E |
| 3,746,738 | 7/1973 | Pepe et al. | 260/77.5 AT |
| 3,793,238 | 2/1974 | Winkelmann et al. | 260/77.5 AT |
| 3,793,253 | 2/1974 | Quiring et al. | 260/77.5 AT |

*Primary Examiner*—H. S. Cockeram
*Attorney, Agent, or Firm*—Joseph C. Gil

[57] ABSTRACT

New polyurethanes which contain silyl-substituted biuret groups in side chains are described. These polyurethanes have high storage stability, high reactivity and can be crosslinked by moisture with the formation of siloxane segments to form high quality end products. The products can be used for the production of high elastic films and temperature resistant and chemically resistant lacquers which can be applied to a wide variety of substrates.

7 Claims, No Drawings

POLYMERS CONTAINING ALKOXYSILYL-SUBSTITUTED BIURET GROUPS AND PROCESSES FOR THEIR PREPARATION

This invention relates to new polyurethanes which contain silyl-substituted biuret groups in side chains. Polymer compounds of this kind, which have high storage stability as well as high reactivity and which are crosslinked by moisture, with the formation of siloxane segments, to yield high-quality end products have not previously been known.

This invention makes available such advantageous products.

An object of the invention is to provide silyl-substituted biuret derivatives of the following formula

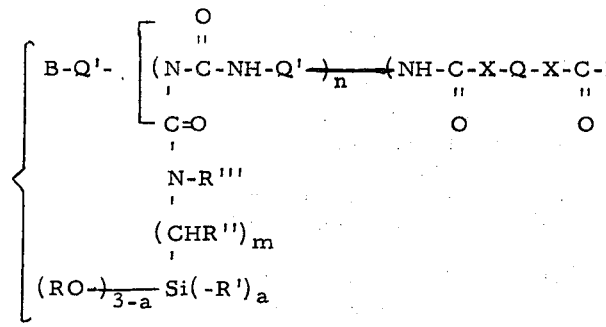

in which
- R represents a $C_1$–$C_{18}$ alkyl, a $C_4$–$C_{14}$ cycloalkyl radical or a phenyl radical,
- R′ represents a $C_1$–$C_{10}$ alkyl, $C_4$–$C_{10}$ cycloalkyl or $C_6$–$C_{10}$ aryl radical, which may be halo- or cyano-substituted,
- R″ represents a hydrogen atom or a methyl or phenyl radical when $m = 1$ or a hydrogen atom when $m = 2$ to 6,
- R‴ represents a hydogen atom or a $C_1$–$C_{18}$ alkyl, $C_4$–$C_{14}$ cycloalkyl or $C_6$–$C_{14}$ aryl radical, which may be halo- or cyano-substituted and/or contain nitrogen or oxygen hetero atoms,
- Q″ represents a divalent alkyl radical containing 4 to 36 carbon atoms or a divalent $C_4$–$C_{14}$ cycloalkyl, $C_6$–$C_{46}$ arylalkyl, $C_6$–$C_{14}$ aryl or $C_7$–$C_{46}$ alkylaryl radical,
- Q′ represents a divalent alkyl radical containing 4 to 36 carbon atoms or a divalent $C_4$–$C_{14}$ cycloalkyl, $C_6$–$C_{46}$ arylalkyl, $C_6$–$C_{14}$ aryl or $C_7$–$C_{46}$ alkylaryl radical, and both Q″ and Q′ may in addition contain ester, isocyanate, carbodiimide, biuret, allophanate or isocyanurate groups,
- Q represents a c-valent radical with a molecular weight of 400 to 150,000, preferably 1000 to 80,000 which has been obtained by the removal of c-hydroxyl or amino groups from a polyol or polyamine which contains ester and/or ether, amide, urethane, uretdione, thioether, acetal, urea, hydrazodicarbonamide, hydrazide and/or carbonate groups and may also contain silylsubstituted biuret groups of the following general formula

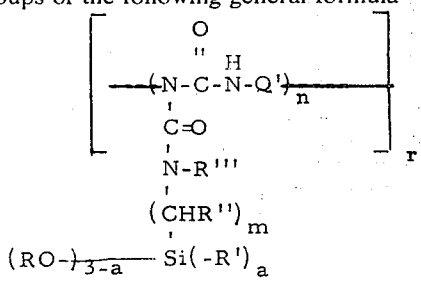

in which
- $a = 0$, 1 or 2;
- $n = 1$ to 4, preferably 1 or 2;
- $r = 0$ to 8, preferably 0 to 4;
- $p = 1$ to 8, preferably 1 to 4;
- $c = 1$ to 8, preferably 2 or 3; and
- X represents O, S, NH or NY;
  where Y represents a $C_1$–$C_{18}$ alkyl radical, $C_4$–$C_{18}$ cycloalkyl radical or a phenyl radical;
- B represents an amino group or

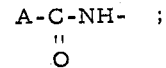

- A represents an alkoxy, cycloalkoxy, aryloxy, $NH_2$ or aminoalkyl radical or a $H_2N$—Z—NH— radical, and
- Z represents a divalent $C_2$–$C_{26}$ alkyl, cycloalkyl, aralkyl or aryl radical.

This invention also relates to a process for the preparation of silyl-substituted biuret derivatives, in which an aminoalkyl silane derivative of the formula

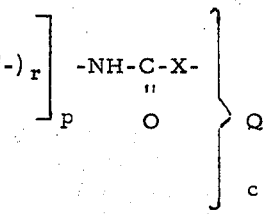

is reacted with a uretdione-containing compound of the following formula

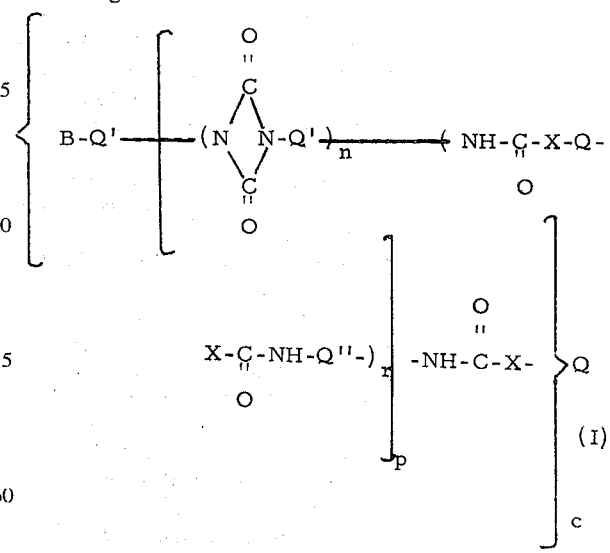

at a temperature of between −40°C and 150°C, preferably in the presence of a solvent, the symbols $a$, $n$, $r$, $p$, Q″, Q′, Q, $c$, B and X having the meanings indicated above.

The starting materials used for the preparation of the substances according to the invention are the above mentioned uretdione-containing polyaddition products of the general formula (I).

These compounds are obtained when polyisocyanates containing uretdione groups as represented by the general formula

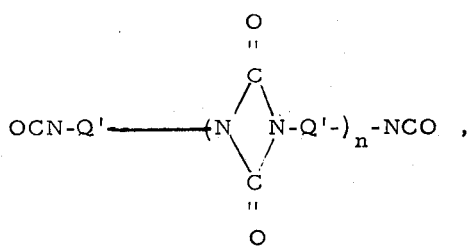

which may be mixed with polyisocyanates OC—N—Q''—NCO, are reacted with compounds of the general formula $(HX)_cQ$ in which Q'', Q', n, Q, X and c have the meanings indicated above, in known manner, for example by the methods disclosed in U.S. Pat. application Nos. 038,915, now U.S. Pat. No., 3,665,040 and 350,676, filed April 12, 1973.

The uretdione-containing polyisocyanates of the general formula

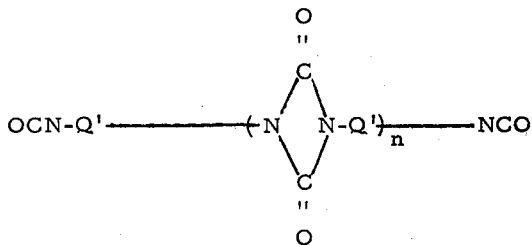

may be, for example, the dimerization products of aliphatic, cycloaliphatic, araliphatic and aromatic diisocyanates (uretdione diisocyanates) or partially uretdionized polyisocyanates which are known per se or can be prepared similarly to known compounds. The following are examples of suitable monomers for the preparation of these uretdione diisocyanates: tetramethylene-1,4-diisocyanate, hexamethylene-1,6-diisocyanate, dodecane-1,12-diisocyanate, cyclohexane-1,3- and -1,4-diisocyanate and any mixtures of these isomers, 1-isocyanato-3,3,5-trimethyl-5-isocyanatomethylcyclohexane, phenylene-1,3- and -1,4-diisocyanate, toluylene-2,4-and -2,6-diisocyanate and any mixtures of these isomers, m-xylylene diisocyanate, hexahydrotolylene-2,4- and -2,6-diisocyanate and any mixtures of these isomers, 4,4'-diisocyanatodicyclohexylmethane, diphenylmethane-4,4'-diisocyanate, diphenylmethane-2, 4'-diisocyanate, 3,3-dimethyl-4,4'-diphenylmethane-diisocyanate and its isomers hydrogenated in the nucleus, 4-methyl-diphenylmethane-3,4'-diisocyanate, diphenyl-4,4'-diisocyanate and dicyclohexyl-4,4'-diisocyanate, 3,3', 5,5'-tetramethyl-diphenylmethane-4,4'-diisocyanate and its isomers hydrogenated in the nucleus, and diphenyldimethylmethane-4,4'-diisocyanate and its isomers hydrogenated in the nucleus.

Partly uretdionized mixtures of polyisocyanates are also suitable for the process according to the invention, for example partly uretdionized products obtained from a. mixtures of the above mentioned diisocyanates with triphenylmethane -4,4',4''-triisocyanate or with polyphenyl-polymethylenepolyisocyanates which can be obtained by aniline-formaldehyde condensation followed by phosgenation;

b. mixtures of diisocyanates with polyisocyanates which contain carbodiimide-isocyanate adducts in accordance with U.S. Pat. No. 3,152,162;

c. the diisocyanates described in U.S. Pat. No. 3,492,330;

d. the polyisocyanates containing allophanate groups according to British Pat. Specification No. 994,890; U.S. Patent application Ser. No. 106,283, filed Jan. 31, 1971, and now abandoned. Dutch Pat. Application No. 7,102,524;

e. the polyisocyanates containing isocyanurate groups as described in U.S. Pat. application Ser. No. 043,603, filed June 4, 1970, and now abandoned;

f. the polyisocyanates with biuret groups described in U.S. Pat. No. 3,124,605;

g. the polyisocyanates prepared by telomerization reactions described in U.S. Pat. No. 3,654,104 or h. the polyisocyanates with ester groups according to British Pat. Specification No. 956,474 and U.S. Pat. No. 3,281,378.

These partially uretdionized di- and polyisocyanate mixtures may be prepared in known manner by leaving monomeric polyisocyanates or mixtures thereof to stand at room temperature for several hours with a suitable catalyst, e.g. 0.5 – 1% by weight of tri-n-butyl phosphine, and then inactivating the catalyst by an alkylation reaction with dimethyl sulphate, methyl p-toluene sulphonate or benzoyl chloride.

Any mixtures of the above mentioned uretdionized polyisocyanates may, of course, also be used.

As a general rule, it is particularly preferred to use uretdione diisocyanates obtained from toluylene-2,4-diisocyanate, tetramethylene-1,4-diisocyanate, hexamethylene-1,6-diisocyanate, 1-isocyanato-3,3,5-trimethyl-5-isocyanato-methyl-cyclohexane, m-xylylene diisocyanate, 4,4'-diisocyanato-dicyclohexylmethane or 4, 4'diisocyanatodiphenylmethane or mixtures of these uretdione diisocyanates with trimeric isocyanurate triisocyanates or the monomeric diisocyanates. Uretdione diisocyanates which contain several uretdione groups and which have been obtained from diisocyanates which contain NCO-groups of equal activity, e.g. diphenylmethane-4,4'-diisocyanate and its isomers hydrogenated in the nucleus, may also be used. If desired, the uretdione groups may first be synthesized in situ, e.g. in NCO prepolymers, for example by the process described in U.S. Pat. No. 3,290,288.

The compounds of formula $(HX)_cQ$ used may be any compounds with a molecular weight of 400 to 150,000 preferably 1,000 to 80,000, which contain OH—, SH—, $NH_2$— or NHY-groups (where Y = an alkyl or cycloalkyl radical containing up to 18 carbon atoms or a phenyl radical) as well as ester and/or ether, amide, thioether, acetal, urethane, urea, hydrazodicarbonamide, hydrazide and/or carbonate groups which may also contain additional uretdione groups. It is preferred to use compounds which contain amino and/or hydroxyl groups, for example polyesters, polyethers, polyester amides or polythioethers with terminal hydroxyl and/or amino groups, or hydroxyl-containing polyurethanes, polyacetals or polycarbonates within the given molecular weight range. The compounds may, of course, contain ester, amide, thioether, acetal, urethane, urea and carbonate groups side by side in the $(HX)_rQ$ molecule.

Compounds which are particularly preferred for the invention are hydroxyl-containing polyaddition products of polyisocyanates and/or uretdione diisocyanates and the compounds mentioned below which contain at least two hydroxyl groups and have a molecular weight of 400 to 4,000:

a. polyesters of adipic acid or phthalic acid and ethylene glycol, butylene glycol, hexane-1,6-diol or neopentyl glycol;

b. polyethers based on ethylene oxide, propylene oxide or tetrahydrofuran;

c. polythioethers or d. polycarbonates of hexane-1,6-diol and diphenyl carbonate.

These compounds are prepared in known manner, e.g. by reacting polycarboxylic acids with polyalcohols, to which amino alcohols may be added or by reacting polyalcohols with dialkyl or diaryl carbonates, by the addition of ε-caprolactone to $C_2$–$C_{18}$ diols, by the addition of, for example, propylene oxide or ethylene oxide to $C_2$–$C_{18}$ diols or by the polymerization of tetrahydrofuran; polythioethers are prepared by reacting thiodiglycol with itself or with other polyalcohols.

Polyurethanes which contain hydroxyl groups are obtained, for example, by reacting hydroxyl-containing polyesters and/or polyethers with a less than equivalent amount of polyisocyanates and/or uretdione diisocyanates, to which known chain-lengthening agents such as water or diols, may be added. The chain-lengthening agents used in this case may also be compounds such as

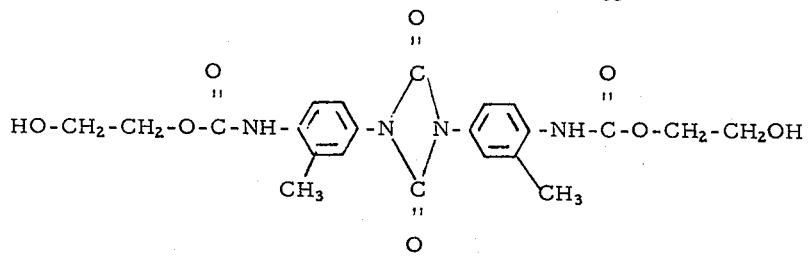

Numerous other chain-lengthening agents which contain aromatically bound uretdione groups are mentioned in "Analytical Chemistry of the Polyurethanes," Volume 16/part III, High-Polymers-Series (Wiley 1969).

The polyurethanes with terminal hydroxyl groups need not be isolated; compounds of the general formula

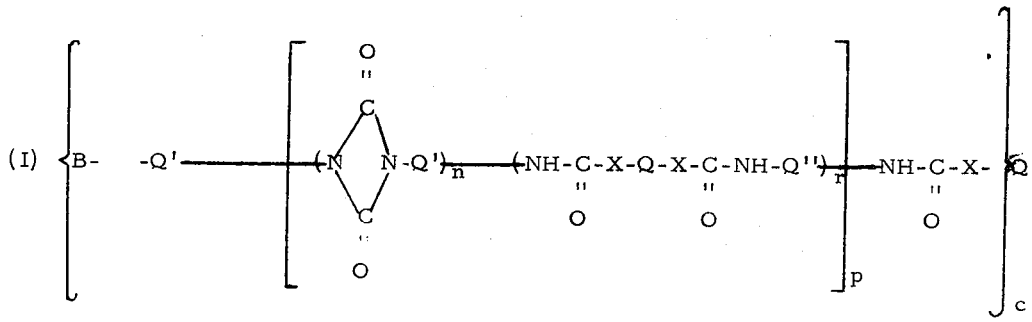

may in this case also be prepared directly by reacting the above mentioned polyesters, polyethers or polycarbonates with chain-lengthening agents, polyisocyanates and uretdione diisocyanates.

According to a more recent proposal, if uretdione diisocyanates of 1-isocyanato-3,3,5-trimethyl-5-isocyanato-methyl-cyclohexane are used, then hydrazines, hydrazides or diamines may also be used as chain-lengthening agents, e.g. ethylene diamine, trimethylene diamine, hexamethylene-1,6-diamine, 1-amino-3,3,5-trimethyl-5-aminomethyl-cyclohexane, 4,4′-diaminodicyclohexylmethane, hydrazine, hydrazine hydrate, carbodihydrazide, 4,4′-diamino-diphenylmethane or 3,3′-dimethyl-4,4′-diamino-dicyclohexylmethane. In that case, it is often advantageous first to prepare an isocyanate-containing prepolymer at an NCO/OH ratio of 1.5–1.01, which prepolymer contains uretdione groups statistically distributed within the chain, and then to react this prepolymer in known manner with chain-lengthening agents, which contain NH— or hydroxyl groups or with water, to which small quantities of chain breaking agents such as monohydric alcohols or monoamines may be added to produce the polyaddition products of the formula (I).

The silyl-substituted biuret derivatives according to the invention are prepared by reacting the uretdione-containing compounds (I) with aminoalkyl silane derivatives of the general formula

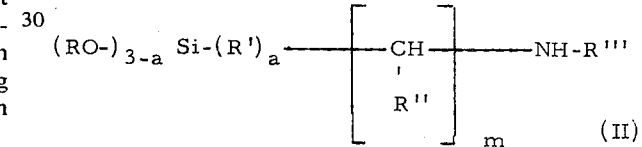

in which R, R′, R″, R‴, $a$ and $m$ have the meanings given above. The following are preferred compounds in which $m = 1$:

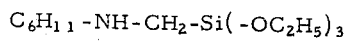

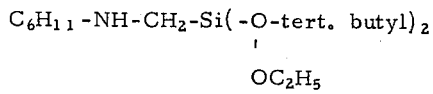

—Continued $C_6H_{11}-NH-CH_2-Si(-OC_2H_5)_2$
          |
          $CH_3$ $C_6H_{11}-NH-CH_2-Si(OC_4H_9)_3$

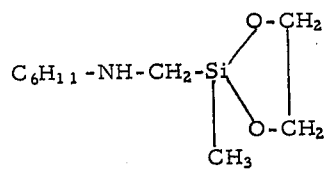

$C_6H_5-CH_2-NH-CH_2-Si(-OC_2H_5)_3$

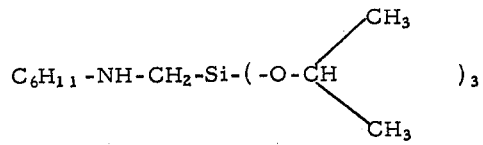

$C_4H_9-NH-CH_2-Si(OC_2H_5)_2$
          |
          $CH_3$ $C_6H_{11}-N-CH_2-Si(OC_2H_5)_3$
       |
       $CH_2$
       |
       $CH_2$
       |
       $CH_2$
       |
       $NH_2$

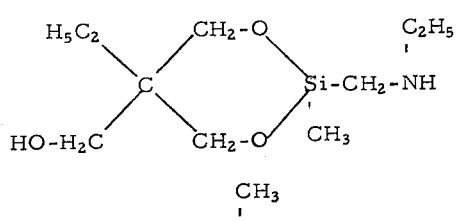

$CH_3$
           |
$C_6H_{11}-NH-CH_2-Si-OC_2H_5$
           |
           $CH_3$ $CH_3$
           |
$CH_3-C-NH-CH_2-Si(-OC_2H_5)_3$
           |
           $CH_3$

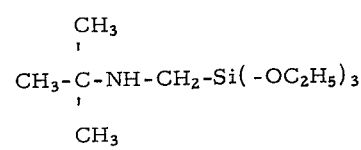

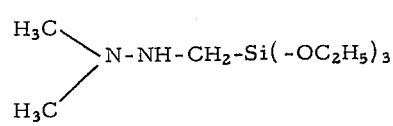

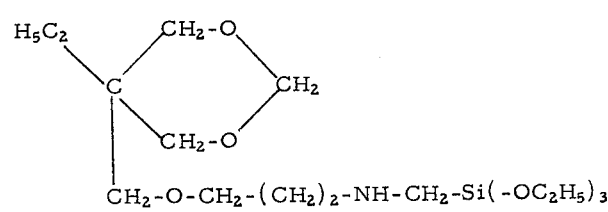

These aminomethyl alkoxysilane derivatives may be prepared by the methods disclosed in U.S. Pat. Nos. 3,673,233 and 3,676,478.

They may generally be obtained, for example, by reacting amines of the formula R'''—$NH_2$ with, for example, chloromethyltriethoxysilane, bromomethyltriethoxysilane, methyl-chloromethyldiethoxysilane, dimethyl-chloromethyl-ethoxysilane, methyl-bromomethyldiethoxysilane or methyl-bromomethyl-di-n-propoxysilane.

Silyl-substituted biuret derivatives which have reduced activity with water are obtained from aminoalkyl silane derivatives of formula (II) in which $m = 2-6$, e.g. compounds of the following formula $H_2N(CH_2)_3Si(-OC_2H_5)_3$ $H_2N(CH_2)_3Si(-OCH_3)_3$ $H_2N(CH_2)_2Si(-OCH_3)_3$ $H_2N(CH_2)_2-N-(CH_2)_3-Si(-OCH_3)_3$
              |
              $CH_3$ $HN-(CH_2)_3Si-(-OCH_3)_3$
  |
  $CH_3$ $H_2N(CH_2)_4Si(-OCH_3)_3$ $HN(CH_2)_4Si(-OC_3H_7)_3$
 |
 $CH_3$ $H_2N(CH_2)_6-Si(-OC_2H_5)_3$ These aminoalkylsilane derivatives are trade products and can be prepared by known methods, e.g. by addition reactions between unsaturated amines and silanes which are capable of addition, using platinum salts as catalysts.

Preparation of the silyl-substituted biuret derivatives according to the invention is generally carried out with equivalent quantities of uretdione-containing compounds (I) and aminoalkylsilane derivatives (II) so that each uretdione group reacts with an amino group.

In some cases, however, it is preferred to react the uretdione groups only partially, e.g. by 5 to 50%. In this way, the reactivity of the products with moisture, i.e. the rate of polysiloxane formation by crosslinking, can be controlled within wide limits. The remaining uretdione groups may then be reacted with monoalcohols by which they are converted into allophanate groups. Alternatively, free uretdione groups can easily be eliminated by means of short chain or long chain primary or secondary monoamines (e.g. the so-called fatty amines) and converted into biuret groups.

For the process according to the invention it is essential that the aminosilane derivatives should be free from polyamino-disiloxanes or polyamino-polysiloxanes with a cyclic or linear structure of the kind which may be formed e.g. by the action of atmospheric moisture. The monomeric aminoalkyl alkoxysilane derivatives should therefore preferably be used in a freshly distilled state.

The reaction of the above mentioned reactants (I) and (II) is carried out at temperatures within a range of about −40°C to 150°C, generally in the presence of a solvent such as dimethylformamide, mixtures of dimethylformamide and alcohols, e.g. ethanol, n-propanol, tert. butanol or n-butanol, or mixtures of these alcohols with benzene, toluene, xylene, cyclohexane, acetone, ethyl acetate or tetralin. It has surprisingly been observed that the products according to the invention are obtained in a stable form suitable for storage if secondary or tertiary alcohols, halogenated alcohols, araliphatic alcohols such as benzyl alcohol or halogenated hydrocarbons or acylated amides are present during the reaction of the aminoalkylsilane derivative (II) with the uretdione-containing compound (I). Secondary or tertiary alcohols or halogenated hydrocarbons or acylated amides are therefore preferably added to the solvent. These secondary or tertiary alcohols, halogenated hydrocarbons or acylated amides may be added in quantities of 0.5 to 97% by weight, preferably 10 to 80% by weight, based on the total quantity of reactants. Premature gelling, crosslinking or sedimentation of the reaction products dissolved in the solvent can thereby be prevented.

Preferred solvent additives are chloroethanol, trichloroethanol, benzyl alcohol, isopropyl alcohol and tert. butanol, ethylene chloride, chloroform, trichloromonofluoromethane, perchloroethylene or trichloroethylene.

The following solvent mixtures are particularly preferred: dimethylformamide/isopropanol (2:1), dimethylformamide/butanol (2:1), dimethylformamide/isopropanol/ethanol (1:1:1), dimethylacetamide/tert. butanol/n-butanol (1:1:1) and dimethylformamide/methylethylketon/isopropanol (3:1:0.5).

The stabilizing effect of the secondary or tertiary alcohols can be enhanced and, at the same time, the reactivity of the products of the process in the crosslinking reaction with atmospheric moisture can be greatly increased by adding to the reaction mixture small quantities of acid anhydrides and acids or compounds which split off acids. The activating effect of these acid additives does not come into effect until the solvent evaporates whereas solutions kept in a sealed container have a viscosity which remains constant over a period of six months, within the limits of error of measurement. This is of great practical importance because the acid additives not only insure a long pot life in vessels which have been sealed against atmospheric moisture but also enable an extremely rapid crosslinking reaction to be brought about at any time, even at temperatures of about −10°C. Polymer solutions obtained in this way take up a supreme position compared with previously known high-molecular weight polymers which are capable of crosslinking as regards the rate of crosslinking and the quantitative course of the reaction with the formation of stable polysiloxane bonds.

The following are mentioned as examples of acids, acid anhydrides or compounds which split off acid which, in accordance with the invention, have an additional stabilizing effect or accelerate the crosslinking reaction of the products according to the invention with moisture: acetic acid anhydride, acetic acid, formic acid, propionic acid, butyric acid, trichloroacetic acid, p-toluene sulphonic acid esters, dimethylcarbamic acid chloride, benzoyl chloride, N-phenyl carbamic acid chloride, chloroacetaldehyde, chloral, propionic acid anhydride, mixed anhydrides of lower carboxylic acids, cyclic anhydrides such as maleic acid anhydride, phthalic acid anhydride, tetrahydrophthalic acid anhydride, semiesters of cyclic acid anhydrides, e.g. those obtained from one mol of phthalic acid anhydride and one mol of methanol, butanol or isopropanol, or semiesters of these cyclic acid anhydrides with glycols which contain both an OH-group and a carboxyl group in their molecule, e.g. the semiesters obtained from one mol of maleic acid anhydride or hexahydrophthalic acid anhydride and one mol of glycol, 1,3-propylene glycol or 1,4-butanediol. The addition of small quantities of readily hydrolyzed esters such as boric acid esters, diethyl oxalate or ethyl orthoformate or of reaction products of p-toluene sulphonyl isocyanate with alcohols or amines or the addition of small quantities of p-toluene sulphonyl isocyanate, acyl isocyanates such as benzoyl isocyanate or hydrochlorides of trimethylamine or triethylamine, etc. may also be advantageous. These compounds which act both as stabilizers and have an accelerating effect in the crosslinking process are preferably added in quantities of 0.2 to 5% by weight, based on solid substance, to solutions of the products of the process in alcohol mixtures or in stabilizing solvents such as chloroform, methylene chloride, perchloroethylene, trichloroethylene, dimethylformamide or dimethylacetamide.

If the products of the process are synthesized in the absence of stabilizing compounds, e.g. in inert organic solvents such as acetone, methyl ethyl ketone, methyl isopropyl ketone, ethyl acetate, butyl acetate, xylene, toluene, dioxane, 1,3-dioxane, cyclohexanone or mixtures of these solvents, then water-binding substances such as methoxy methyl isocyanate, phenyl isocyanate, p-tolyl sulphonyl isocyanate, acyl isocyanate, chlorocarbonyl isocyanate or readily saponifiable esters of oxalic or boric acid should be added after completion of the reaction and the stabilizing alcohols should be added subsequently.

If desired, substantial quantities, e.g. 10–15% by weight, of aliphatic, cycloaliphatic or araliphatic carboxylic acid anhydrides, mixed anhydrides or cyclic anhydrides may be added to the solutions of the biuret derivatives according to the invention. In that case, acyloxysilane groups are formed to a slight extent in the dissolved products by exchange reactions with alkoxy groups, or partial formation of silanol groups takes place if free carboxylic acids are added.

The products according to the invention may be mixed with known active or inactive fillers, e.g. chalk, talcum, silica, silica gel, quartz powder, titanium dioxide, iron oxide, zirconium silicate, calcium sulphate, aluminum oxide, magnesium oxide, carbon black, graphite, sand or finely dispersed fillers based on silicon oxide. All these fillers must either be dehydrated to a high degree or rendered anhydrous by dehydration in the preferred stabilizing alcohols and their acid additives.

The products of the invention, especially in their stabilized form are valuable substances which can be cold hardened by moisture or compounds which liberate water on decomposition without the use of catalysts, i.e. they are extremely readily crosslinked without the action of heat, and they can be processed into numerous end products. They can be used for the production of highly elastic films and temperature resistant and chemically resistant lacquers and coatings which can be applied to any substrates and they can be used for the production of rubbery elastic products, fibers and sealing compounds and for embedding electrical devices, for insulating against cold or heat, for laminating pigments and for elastically enveloping water-soluble plant nutrient salts. They may be used as corrosion protective agents and for bonding metals such as silver, aluminum or copper. They are firmly bonding adhesives which render the substances hydrophobic without crosslinking and they act as rapidly crosslinking surface-active compounds and as laminating and gumming agents for fibers and fleeces and as bonding agents for fleeces. They are also excellent adhesives. According to the invention, a wide variety of synthetic resin segments can be crosslinked by way of siloxane bridges and combined with each other, and if desired aminoalkyl silane derivatives of the general formula

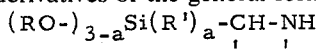

mentioned above, in which R, R', R'', R''' and *a* have the meanings indicated above may be added in quantities of 2–60% by weight to the products according to the invention in the crosslinking reaction. This measure makes it possible to influence the bond strength and the degree of crosslinking and swelling. It may also be advantageous to add low-molecular weight silyl ureas or silyl biurets as chain-lengthening agents or chain cross-linking agents to the products according to the invention. These low-molecular weight silyl ureas are obtained by reacting aminoalkyl silane derivatives with diisocyanates, urethane diisocyanates, biuret triisocyanates, trimerized diisocyanates or polyisocyanates which contain carbodiimide groups, semicarbazide groups or acyl amide groups. These low-molecular weight silyl ureas may in addition contain NCO-groups, for example if the aminoalkyl silane derivatives are reacted with an excess of the above mentioned dior triisocyanates. High molecular weight polyurethanes which contain silyl urea groups as described in U.S. Pending Pat. application Ser. No. 303,192, filed Nov. 2, 1972, and U.S. Pending Pat. application Ser. No. 303,671, filed Nov. 2, 1972, may, of course, also be added to the products according to the invention in proportions of about 20 to 200% by weight before the crosslinking reaction to control the bond strength, degree of crosslinking and swelling of the polymers which are crosslinked by way of siloxane groups.

The products according to the invention which are stabilized and which can be activated on application make possible new and economical processes for impregnating any synthetic or natural fibers or threads or providing them with a dressing which is free from tackiness so that they can be rolled up at high speed without sticking. The present invention also makes possible elegant and rapid methods of dip-varnishing and dip-coating for the insulation of cables and methods for the production of rapidly reacting cable sheaths for wire lacquering using rapidly crosslinking substances with good adhesive properties and high bond strengths. Another interesting application is in the rapid and non-sticky coating of pigments which contain moisture.

The products according to the invention may also be mixed with organopolysiloxanes which can be crosslinked in known manner, e.g. those which are produced by the condensation of chlorosilanes and alkoxysilanes by cohydrolysis with water or by polymerization of cyclic organosiloxanes with the aid of alkaline or acid catalysts and which are then crosslinked, e.g. with α, ω-dihydroxy-polydimethyl siloxanes. The products of the process are also eminently suitable for matrix reactions on the principle according to U.S. Pending Pat. application Ser. No. 017,349, filed Mar. 6, 1970, and now abandoned, and for the impregnation of foam resins in a manner analogous to U.S. Pending Pat. application 155,284, filed June 21, 1971, and now abandoned.

The new substances according to the invention and their mixtures make it possible to produce synthetic resins which can be crosslinked in the cold by moisture, e.g. firmly bonding, elastic and very lightfast coatings and lacquers on various metals and noble metals, e.g. by simple and rapid dip-varnishing of sheet metals and shaped metal parts and they also make it possible for elastic and abrasion-resistant semihard or hard synthetic resin lacquers to be produced.

The use of the substances according to the invention for finishing paper, textiles and foam resins and particularly polyurethane foam resins is also important. Particularly elegant methods of application are possible with controlled crosslinking of products of the process which have been stabilized with alcohols and acid additives. It is very advantageous that the activating effect of these acid additives does not take place until during and after application of the products of the process, i.e. on evaporation of the solvent mixtures which contain alcohols. Whereas the acid additives ensure a constant viscosity of the products while they are kept in closed containers, controlled crosslinking of the products according to the invention sets in immediately, as soon as the alcohol concentration in the drying film decreases in the presence of atmospheric moisture. The controlled crosslinking of the products, i.e. crosslinking which takes place at a selected point in time, with formation of polysioxane bridge members, e.g. in the presence of atmospheric moisture, can be so highly accelerated by the acid additives that crosslinking can be completed within a few minutes in the cold.

The following Examples serve to explain the wide range of variation of the process according to the invention.

EXAMPLES

EXAMPLE 1:

a. 200 parts by weight (0.1 mol) of a polyester from adipic acid and ethylene glycol with OH-number 56 are dehydrated for 30 minutes at 130°C and then reacted with a solution of 17,5 parts by weight of 4,4'-diisocyanatodiphenylmethane and 10,5 parts by weight of the uretdione diisocyanate of the following formula

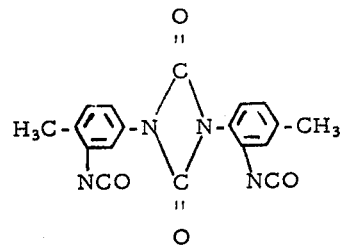

in 800 parts by weight of anhydrous dimethylformamide at 60°C with stirring.

b. The procedure is the same as that described in a) but 12.8 parts by weight of toluylene-2,4-diisocyanate and 10.5 parts by weight of dimerized toluylene-2,4-diisocyanate are used.

In both cases a) and b) the polyaddition is carried out for 6 hours at 60°C. Polyurethanes with built-in uretdione groups (polyurethane U) are obtained. 8.3 parts by weight of N-cyclohexyl(aminomethyl)-triethoxysilane dissolved in 8.3 parts by weight of dimethylformamide are then added. The addition reaction on the uretdione ring proceeds even at room temperature and polyurethanes which are highly reactive to moisture and which contain about 0.03 silyl biuret equivalents of the following formula

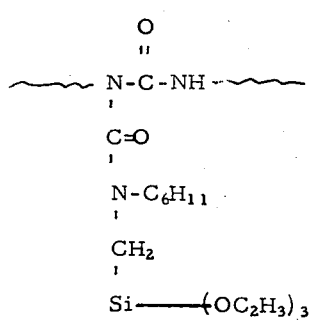

(polyurethane A) are obtained. The viscosity at 25°C is 550 cP. Crosslinked films or microporous foils with high elasticity and strength which are insoluble in hot dimethyl-formamide are obtained by storing the cast films in moist air or in a saturated water vapor atmosphere whereas comparison samples of polyurethane U are readily dissolved even in cold dimethylformamide.

The polyurethane solution which contains silylized biuret groups is completely free from gel particles and crosslinked polyaddition products. If stored in the absence of moisture, the solution is stable for 30 days at room temperature. After this time, the viscosity starts to rise and rises continuously to values about 40,000 cP and the polyurethane polyurea becomes completely crosslinked. All viscosity determinations are carried out in sealed test tubes used for only one measurement. All the test tubes were heated to 100°C before the introduction of the polyurethane samples A, filled while still hot and then sealed. The stability of the samples A on storage is greatly increased by the addition of 0.5% by weight of acetic acid anhydride (samples B). Even after storage for 6 months at 20°–25°C, the viscosity of these samples B is still practically unchanged at 558 cP, determined at 25°C.

When samples A and B are poured on glass substrates high-quality, very strong films which adhere firmly to the glass are obtained. The films obtained from samples A are quantitatively crosslinked after 10 – 15 minutes at a relative humidity of about 60% whereas samples B which have been stabilized with acetic acid anhydride are completely crosslinked after only 5 minutes.

Crosslinked films, lacquers and coatings obtained from samples A and B have excellent strength, stretchability, elasticity and chemical resistance as shown by the following figures:

| | |
|---|---|
| Tensile strength (DIN 53 504) | 400 kp/cm² |
| Elongation at break | 450% |
| Permanent elongation | 8% |
| Shore hardness A (DIN 53 505) | 45% |
| Elasticity (DIN 53 512) | 46% |

If acetic acid anhydride used as stabilizing agent is replaced by a. 0.3% by weight of acetic acid,
b. 0.4% by weight of propionic acid anhydride,
c. 0.05% by weight of dimethyl carbamic acid chloride,
d. 0.04% by weight of formic acid or
e. 0.03% by weight of methyl p-toluene sulphonate, then the viscosity after 3 months, measured at 21°C (initial viscosity 510 cP) is as follows:

a. 556 centipoises
b. 561 centipoises
c. 562 centipoises
d. 559 centipoises
e. 568 centipoises

EXAMPLE 2:

This Example illustrates that the chemical resistance and bond strength of the crosslinked products of the process are greatly improved by the addition of low-molecular weight polyaddition products with silylized urea groups to the high-molecular weight polyaddition products with silylized urea groups according to the invention. The low-molecular weight polyaddition products used as chain-lengthening agents or chain crosslinking agents are built statistically into the products of the process by the polysiloxane condensation which is released by moisture.

The procedure is the same as that described in Example 1 but the low-molecular weight silyl ureas containing ethoxy-silane groups described below are added before the polyurethane solution which contains silylized biuret groups is applied to the substrate: 50% solutions (% by weight) of the following compounds are first prepared:

a. 4.78 parts by weight of a triisocyanate having the following theoretical composition:

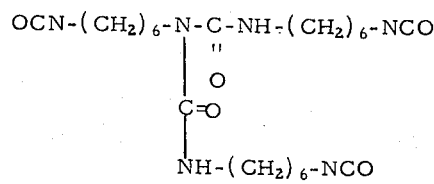

b. 5.8 parts by weight of

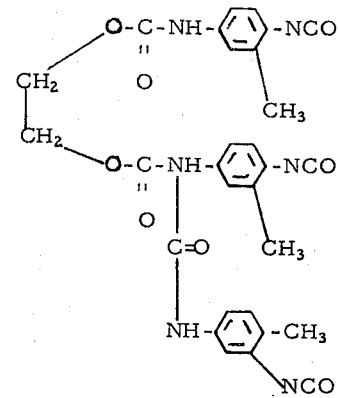

c. 5.04 parts by weight of
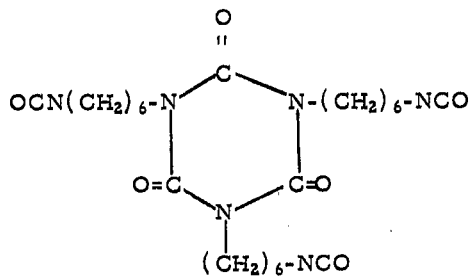
d. 3.36 parts by weight of
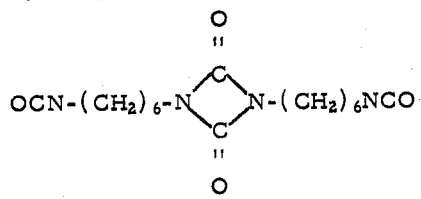
e. 5.04 parts by weight of
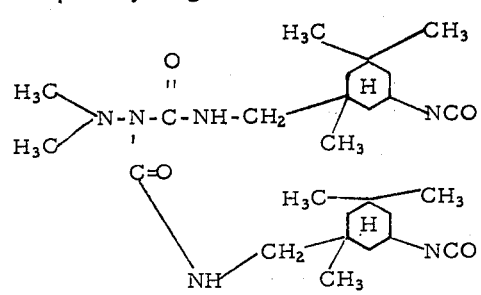
f. 3.8 parts by weight of
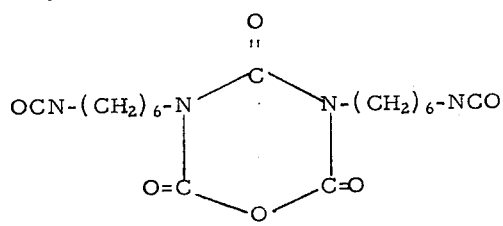
g. 3.67 parts by weight of
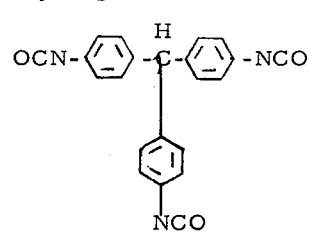
h. 4.65 parts by weight of
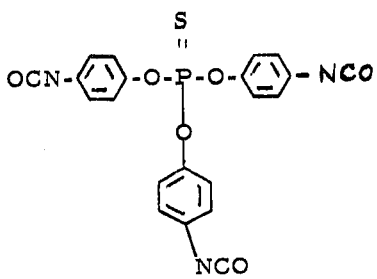
i. 5.06 parts by weight of
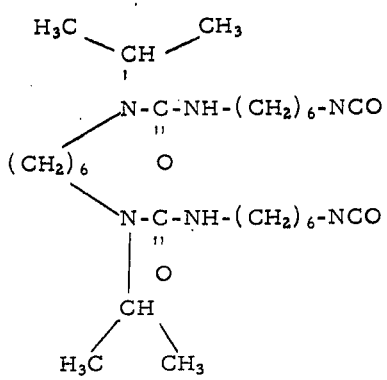
j. 5.38 parts by weight of
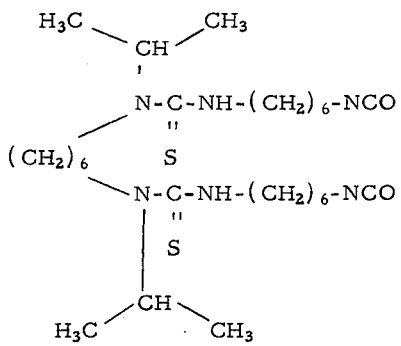
k. 9.12 parts by weight of
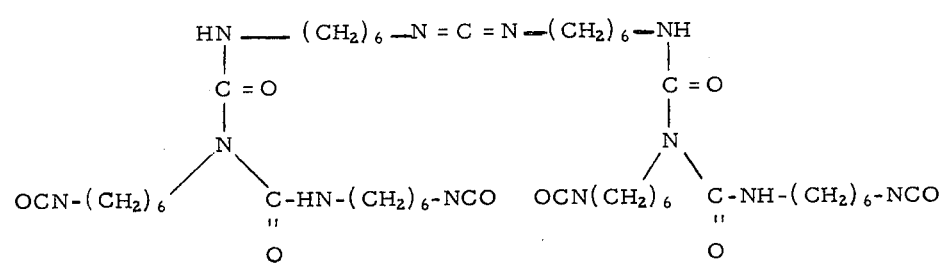

in anhydrous chloroform, methylene chloride or perchloroethylene and the solutions are then reacted with 8.25 parts by weight of N-cyclohexyl(aminomethyl)-triethoxysilane dissolved in 6.88 parts by weight of toluene, the reaction being carried out at 15°C with cooling. The isocyanate groups are thereby converted into low-molecular weight silyl urea-ethoxysilane end groups.

The resulting low-molecular weight silyl urea solutions (a) to (k) are mixed with the solution of the polyaddition product prepared according to Example 1. The mixtures obtained are stable to storage and when used for the formation of films they are distinguished by excellent levelling flow. The polysiloxane cross-linking brought about by atmospheric moisture results in sheets which adhere firmly to glass fibres, ceramic supports and aluminum oxides. Films which contain the low-molecular weight cross-linking agents a, b and c undergo percentage dimensional changes of only 6–7% by swelling in trichloroethylene whereas the films described in Example 1 are subject to a much higher degree of swelling (dimensional changes of about 19%).

EXAMPLE 3:

The procedure is initially the same as that described in Example 1 but low-molecular weight silyl ureas which contain ethoxysilane groups are added as chain-lengthening agents or cross-linking agents to the polyaddition products with silylised biuret groups.

Solution A prepared according to Example 1, which contains about 20% by weight of solids, is mixed with the following silyl ureas or bis-5-sila-imidazolidone-(2) derivatives in 50% toluene solution:

a. 7.18 parts by weight of

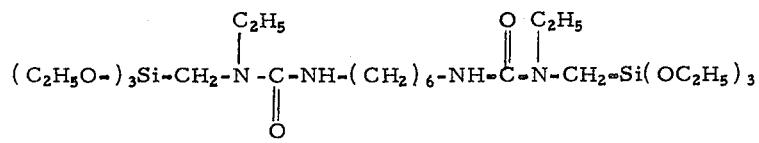

b. 7.24 parts by weight of

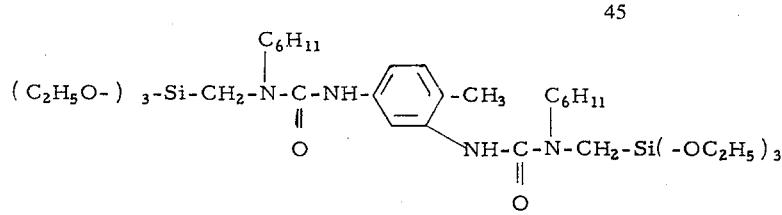

c. 9.64 parts by weight of

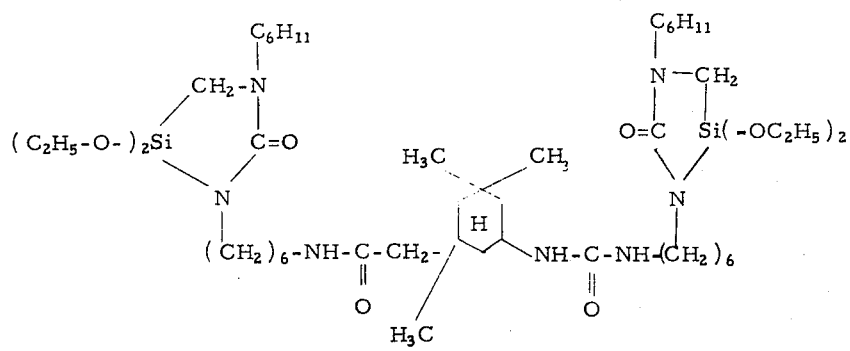

d. 4.14 parts by weight of

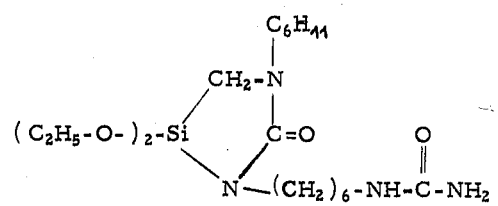

e. 3.98 parts by weight of

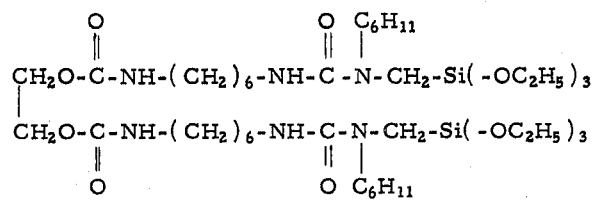

f. 3.94 parts by weight of

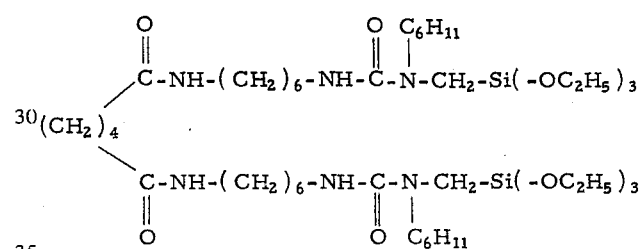

g. 5.8 parts by weight of

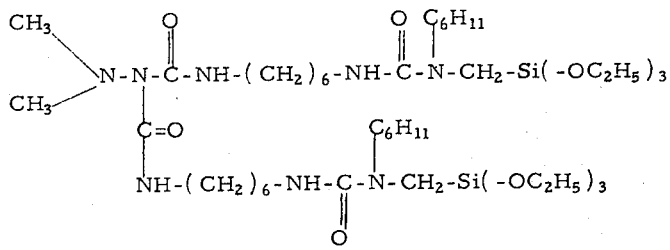

The mixtures obtained are highly reactive and stable to storage and when cross-linked on open-celled polyurethane foam resin substrates they give rise to extremely firmly adhering impregnations and coatings and also clothe the cells of the matrix.

EXAMPLE 4:

The procedure is exactly the same as the one described in Example 1 but the 0.02 mol of N-cyclohexyl-(aminomethyl)-triethoxysilane is replaced by 0.02 mol of the following freshly distilled aminomethyl trialkoxy or -dialkoxy derivatives:

a. 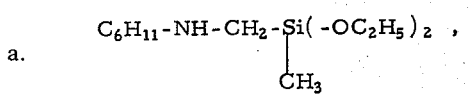

b. 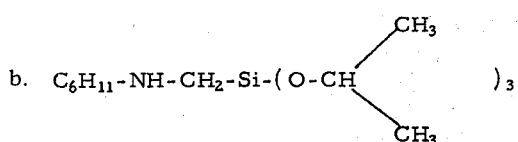

c. $C_2H_5$—NH—$CH_2$—Si(—$OC_2H_5$)$_3$
d. $C_2H_5$—$CH_2$—NH—$CH_2$—So(—$OC_2H_5$)$_3$ e. 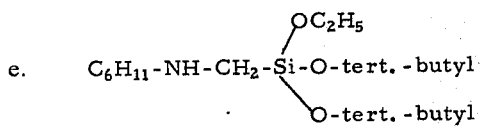

f. $H_2N$—$CH_2$—$CH_2$—$CH_2$—Si(—$OC_2H_5$)$_3$
g. $H_2N$—$CH_2$—$CH_2$—$CH_2$—Si(—$OCH_3$)$_3$

The products obtained with compounds (a) to (e) are highly reactive, approximately 20% polyurethane solutions which have excellent film-forming properties. The films of solutions (a) to (e) are completely cross-linked in about 6 hours at room temperature by moisture whereas solutions (f) and (g) are much less reactive to moisture that can be activated by the addition of about 0.5% by weight of tin dibutyl dilaurate. When solutions (f) and (g) are subsequently treated by heat, a slow cross-linking reaction sets in after 10 minutes at 120°C.

EXAMPLE 5:

The procedure is the same as that described in Example 1 but the polyester used in Example 1 is replaced by (a) a polyester of adipic acid and butane-1,4-diol, OH-number 51;

b. a polyester of adipic acid, hexanediol and neopentyl glycol (molar ratio 30:22:12), OH-number 58;

c. polythioether of thiodiglycol and triethylene glycol (70:30), OH-number 53;

d. polybutylene glycol polyether, OH-number 49.

Highly reactive 20% by weight solutions which are stable to storage are obtained, which are cross-linked quantitatively within 10 minutes at room temperature and 50–60% relatively humidity to form highly elastic films with high tensile strength. The solutions are stable in storage and have the following viscosities at 25°C:
a. 870 centipoises
b. 540 centipoises
c. 1800 centipoises
d. 1500 centipoises

EXAMPLE 6:

The procedure is the same as that of Example 1 but the α,ω-dihydroxy compound used in a polypropylene glycol polyether with OH-number 56.

A water-clear, approximately 20% solution of a polyether-polyurethane which contains silylised biuret groups is obtained. Films cast on glass or sheet metal substrates are quantitatively cross-linked after 30 minutes under the conditions described in Example 1.

EXAMPLE 7:

This Example illustrates that the process according to the invention may also be used for the conversion of combinations of the products of the process with other low-molecular weight and high-molecular weight polyaddition products which contain ethoxysilane groups into cross-linked polymers which adere very firmly to glass fibres and substrates.

100 parts by weight of the solution of polyurethane with silylised biuret groups prepared according to Example 1 are mixed with 3.8 parts by weight of the following compound

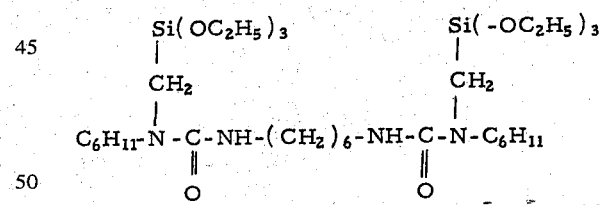

and 200 parts by weight of a 20% solution of the high-molecular weight polyurethane-polyurea with silyl urea end groups described below.

200 parts by weight of a dehydrated polyester of adipic acid and butane-1,4-diol with OH-number 56 are first reacted with 44.4 parts by weight of 1-isocyanato-3,3,5-trimethyl-5-isocyanatomethyl-cyclohexane to product an α,ω-diisocyanato-prepolymer. The reaction product is taken up in 300 parts by weight of toluene, and an additional 44.4 parts by weight of 1-isocyanato-3,3,5-trimethyl-5-isocyanatomethyl-cyclohexane are added to the solution at room temperature. A solution 45.9 parts by weight of 1-amino-3,3,5-trimethyl-5-aminomethyl-cyclohexane in 405 parts by weight of toluene and 705 parts by weight of tert. butanol is added to this mixture with vigorous stirring. The NCO end groups of the high-molecular weight polyurethane polyurea are then reacted with 18 parts by weight of N-cyclohexyl-aminomethyl-triethoxysilane to produce an α,ω-silylised polyurethane-polyurea. An approximately 20% solution is obtained which is completely free from gel particles and which has a viscosity of 65 centiposies at 25°C.

The three-component mixture obtained is cast to form films. The films are cross-linked after only one hour at room temperature. Rapid evaporation of the solvent mixture at 70°C results in very hard films which cannot be detached from glass substrates whereas polyurethanes which have not been cross-linked are easily stripped from glass substrates.

EXAMPLE 8:

200 parts by weight of a copolyester of adipic acid, hexane-1,6-diol and neopentyl glycol having an average molecular weight of 1680 (0.238 equivalents of OH) are reacted with 41.56 parts by weight of dimeric toluylene-2,4-diisocyanate (0.238 equivalents of free NCO) in 242 parts by weight of anhydrous dimethylformamide for 12 hours at temperatures of between 55° and 60°C to produce a polyurethane which contains uretdione groups. The dimeric diisocyanate slowly dissolves the viscosity increases continuously. The approximately 50% solution is then diluted to 26% with 447 parts by weight of dimethylformamide. The viscosity of the solution is approximately 400 P, the ηi-value is 1.04. ηi, the inherent viscosity, is defined as follows:

$$\eta i = \frac{{}^{ln}\eta_r}{c}$$

where $\eta_r$ is the relative viscosity of the solution of polyadditions product in hexamethyl phosphoramide at 20°C and $c$ is the concentration of the solution in g/100 ml.

Only 10% of the 0.238 equivalents of uretdione groups incorporated in the polymer, i.e. 0.0238 equivalents, are then reacted to form silylised biuret groups by the addition of 6.54 parts by weight of $C_6H_{11}$—N—H—$CH_2$—Si($-OC_2H_5$)$_3$ and 280 parts by weight of dimethylformamide. An approximately 20% solution which is stable in storage and has a viscosity of 25,000 cP at 25°C is obtained.

The solution is applied to glass plates and the solvent is then evaporated at room temperature or at 70–100°C in a slight vacuum. Transparent, cross-linked films are obtained. If the freshly cast film is coagulated in a steam atmosphere, opaque to white, microporous films which are permeable to water vapour and completely insoluble in dimethylformamide are obtained.

EXAMPLE 9:

This Example illustrates that the products according to the invention have excellent bonding properties on glass substrates and fibers if they are reacted with chain-lenghtening agents which contain both ethoxysilane groups and NCO groups in the same molecule.

1000 parts by weight of the solution prepared according to Example 1 are mixed with a. 25 parts by weight of

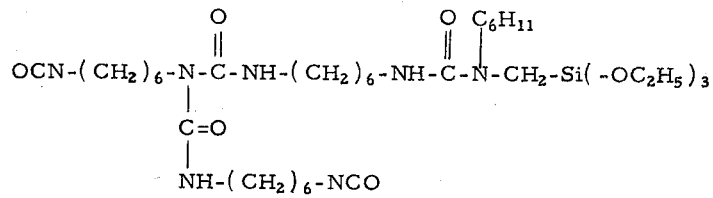

b. 30 parts by weight of

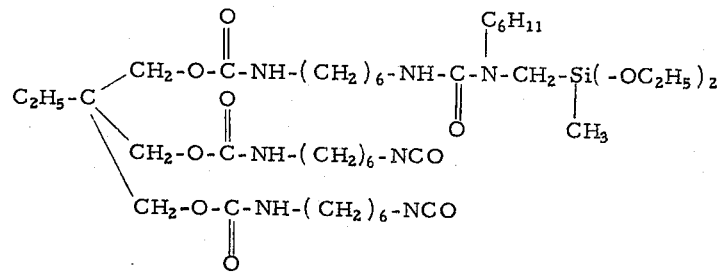

c. 17 parts by weight of

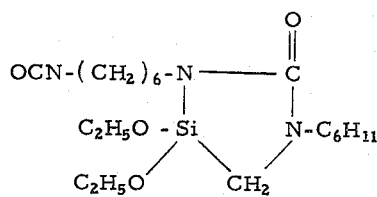

d. 25 parts by weight of

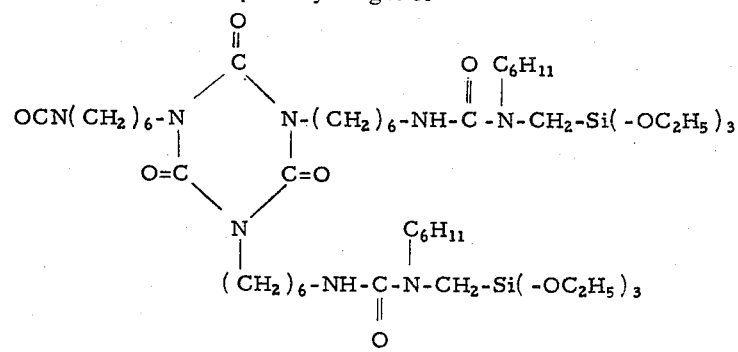

e. 19 parts by weight of

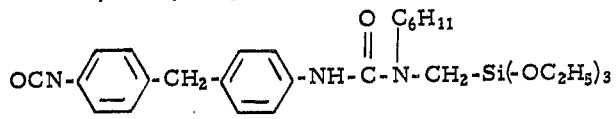

f. 25 parts by weight of

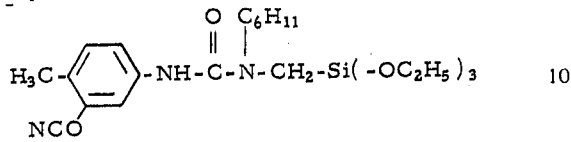

g. 35 parts by weight of

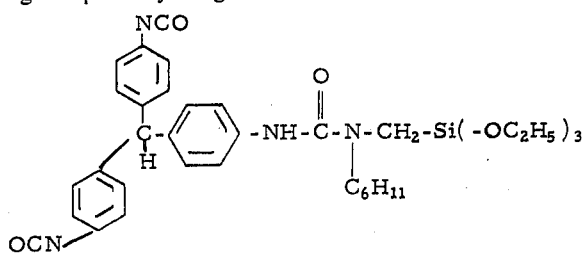

All the mixture (a) to (g) undergo cross-linking at a relative humidity of about 70% to form films which adhere exceptionally firmly to glass substrates and fibres.

EXAMPLE 10:

This Example illustrates the high fastness to light of films obtained from the products according to the invention.

200 parts by weight (0.1 mol) of a polyester of adipic acid and ethylene glycol with OH-number 56 are dehydrated at 120°C for 30 minutes and then reacted for 30 minutes at the same temperature with 44.4 parts by weight of 1-isocyanate-3,3,5-trimethyl-5-isocyanatomethyl cyclohexane (0.2 mol) to produce an $\alpha,\omega$-diisocyanato prepolymer. The temperature of the NCO prepolymer is allowed to drop to 100°C and the prepolymer is then diluted with 200 parts by weight of toluene. The solution is cooled to 30°C and rapidly diluted with a mixture of 100 parts by weight of toluene and 26.6 parts by weight of a diisocyanate mixture which consists of about 60.6% by weight of 1-isocyanato-3,3,5-trimethyl-5-isocyanatomethyl-cyclohexane, 33.4% by weight of dimeric 1-isocyanto-3,3,5-trimethyl-5-isocyanatomethyl-cyclohexane and 6% by weight of trimeric 1-isocyanato-3,3,5-trimethyl-5-ioscyanatomethyl-cyclohexane (NCO-content of the mixture: 31.6% NCO; 0.02 uretdione equivalents in 26.6 parts by weight of the mixture). A solution of 34 parts by weight of 1-amino-3,3,5-trimethyl-5-aminomethyl-cyclohexane in 116 parts by weight of anhydrous toluene and 416 parts by weight of anhydrous tert. butanol is then added dropwise to this mixture at 20°-24°C, over a period of 20 minutes, with rapid stirring. The solution of polyester polyurethane-polyurea which contains 0.02 equivalent of uretdione groups is then immediately reacted with 5.5 parts by weight of freshly distilled $$C_6H_{11}-\underset{H}{N}-CH_2-Si(-OC_2H_5)_3$$

and the reaction is continued for 3 hours at 60°C. The water-clear, approximately 26.5% solution of the polyaddition product has a viscosity of 1820 centiposies at 25°C. When the solution is poured out on to a substrate and dried at room temperature, lightfast, cross-linked films are obtained which become insoluble in dimethylformamide after 24 hours.

What is claimed is:

1. Silyl-substituted biuret derivatives of the formula:

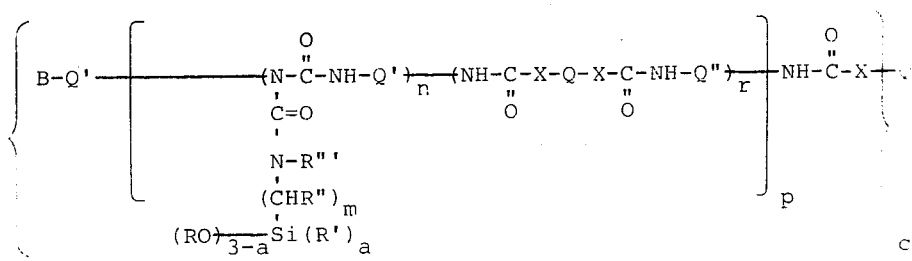

wherein

R represents a $C_1-C_{18}$ alkyl, $C_4-C_{14}$ cycloalkyl or a phenyl radical,

R' represents a $C_1-C_{10}$ alkyl, $C_4-C_{10}$ cycloalkyl or $C_6-C_{10}$ aryl radical, which may be halo- or cyano-substituted, represents a hydrogen atom or a methyl or phenyl radical if $m = 1$ or a hydrogen atom if $m = 2$ to 6, R''' represents a hydrogen atom or $C_1-C_{18}$ alkyl, $C_4-C_{14}$ cycloalkyl or $C_6-C_{14}$ aryl radical, which may be halo- or cyano-substituted and/or certain nitrogen or oxygen hetero atoms, Q'' represents a divalent alkyl radical with 4 to 36 carbon atoms or adivalent $C_4-C_{14}$ cycloalkyl, $C_7-C_{46}$ arylalkyl, $C_6-C_{14}$ aryl, or $C_7-C_{46}$ alkylaryl radical, represents a divalent alkyl radical containing 4 to 36 carbon atoms or a divalent $C_4-C_{14}$ cycloalkyl, $C_6-C_{46}$ arylalkyl, $C_6-C_{14}$ aryl or $C_7-C_{46}$ alkylaryl radical, and both Q'' and Q' may in addition contain ester, isocaynate, carbodiimide, biuret, allophanate or isocyanurate groups, represents a radical with a valency of $c$ and a molecular weight of 400 to 150,000, which has been obtained by the removal of c-hydroxyl groups or amino groups from a polyol or polyamine which contains ester or ether or both, amide, urethane, uretdione, thioether, acetal, urea, hydrazodicarbonamide, hydrazide or carbonate, or both hydrazide and carbonate groups, X represents O, S, NH or NY, where Y represents a $C_1-C_{18}$ alkyl radical, a $C_4-C_{18}$ cycloalkyl radical or a phenyl radical, B represents an amino group or

A-C-NH-,
‖
O where
A represents an alkoxy, cycloalkoxy, aryloxy, $NH_2$ or aminoalkyl radical or an $H_2N-Z-NH-$ radical, where Z represents a divalent $C_2-C_{26}$ alkyl, cycloalkyl, aralkyl or aryl radical,
$a = 1$ or $2$,
$m = 1$ to $6$,
$n = 1$ to $4$,
$r = 0-8$,
$p = 1-8$, and
$c = 1-8$.

2. The product of claim 1 wherein Q represents a radical which has been obtained by the removal of c- hydroxyl groups or amino groups from a polyol or polyamine which contains silylized biuret groups of the following general formula:

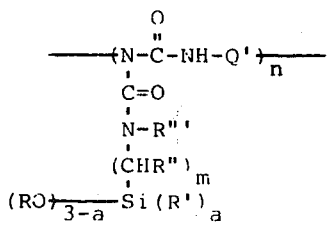

3. The product of claim 1 wherein Q represents a radical with a molecular weight of 1000 to 80,000.

4. The product of claim 2 wherein $n = 1$ or $2$
$r = 0$ to $4$
$p = 1$ to $4$
$c = 2$ or $3$ 5. Process for the preparation of silyl-substituted biuret derivatives according to claim 1, comprising reaction aminoalkyl silane derivative of the formula $$(RO-)_{3-a}Si(R')_a \underbrace{\begin{bmatrix} CH-NH \\ | & | \\ R'' & R''' \end{bmatrix}}_{m}$$

in which R, R', R'', R''', a and m have the meanings already indicated with a uretdione-containing compound of the following formula

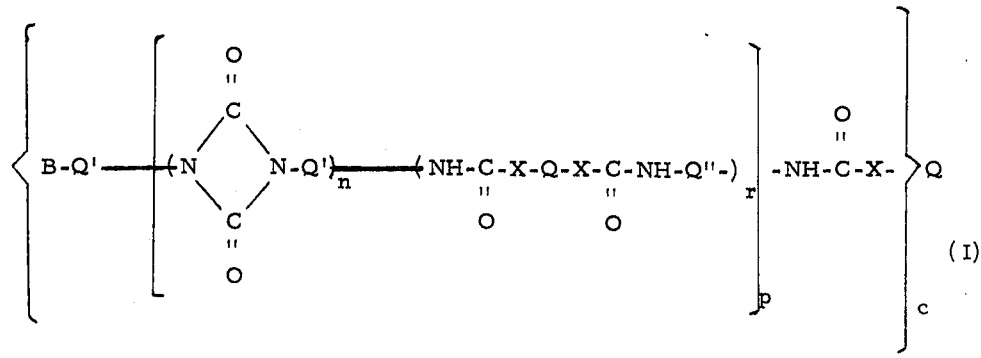

(I)

in which Q, Q', Q'', X, B, c, n, r and p have the meanings already indicated, the reaction being carried out at a temperature of between $-40°C$ and $150°c$, preferably in C, presence of a solvent.

6. Process according to claim 5, wherein the solvent consists completely or partly of secondary or tertiary alcohols, halogenated hydrocarbons or acylated amides.

7. Process according to claim 6, wherein the secondary alcohol used is isopropyl alcohol, the tertiary alcohol used is tertiary butanol, the halogenated hydrocarbons used are methylene chloride, chloroform, trichloromonofluoromethane, perchloroethylene or trichloroethylene, and the acylated amides used are dimethylformamide, methylformamide or dimethylacetamide.

* * * * *

UNITED STATES PATENT AND TRADEMARK OFFICE
CERTIFICATE OF CORRECTION

PATENT NO. : 3,903,052
DATED : September 2, 1975
INVENTOR(S) : KUNO WAGNER; HANS JURGEN MULLER It is certified that error appears in the above-identified patent and that said Letters Patent are hereby corrected as shown below:

Column 1, line 59, correct the spelling of --silyl-substituted--

Column 4, line 3, correct the spelling of --polyphenyl-polymethylene-polyisocyanates--

Column 12, line 42, correct the spelling of --polysiloxane--

Column 19, line 36, in the formula, correct "So" so that it reads --Si--, same column, line 50, correct "that" so that it reads --but--

Column 20, line 37, correct the spelling of --adhere--.

Column 21, lines 52 and 53, correct the formula so that it reads $$-- \eta i = \frac{\ln \eta r}{c} --$$

Column 24, line 49, insert a space between "a" and "divalent"; same column, line 51, after "radical," begin a new line indicating the value of Q' as follows --Q' represents a divalent....--

Column 25, line 8, correct the value of "a" so that it reads --a = 0, 1 or 2,--;

Column 26, line 32, correct "150°c" so that it reads --150°C--; same column, line 33, after "in" delete "C,".

Signed and Sealed this

Twenty-fourth Day of August 1976

[SEAL]

Attest:

RUTH C. MASON
Attesting Officer

C. MARSHALL DANN
Commissioner of Patents and Trademarks